324-77 CROSS REFERENCE SEARCH ROOM

April 27, 1965 M. R. SCHROEDER 3,180,936
Filed Dec. 1, 1960 5 Sheets-Sheet 1

APPARATUS FOR SUPPRESSING NOISE AND DISTORTION IN COMMUNICATION SIGNALS

INVENTOR
M. R. SCHROEDER
BY *A. E. Hirsch* [signature]
ATTORNEY

INVENTOR
M. R. SCHROEDER
BY
C. E. Hirsch Jr.
ATTORNEY

INVENTOR
M. R. SCHROEDER
BY
C. E. Hirsch Jr.
ATTORNEY

INVENTOR
M. R. SCHROEDER
BY G. E. Hirsch Jr.
ATTORNEY

INVENTOR
M. R. SCHROEDER
BY C. E. Hirsch Jr.
ATTORNEY 3,180,936

APPARATUS FOR SUPPRESSING NOISE AND DISTORTION IN COMMUNICATION SIGNALS

Manfred R. Schroeder, Gillette, N.J., assignor to Bell Telephone Laboratories, Incorporated, New York, N.Y., a corporation of New York Filed Dec. 1, 1960, Ser. No. 73,116
15 Claims. (Cl. 179—1)

This invention relates to the modification of communication signals impaired by noise and distortion, and in particular to the improvement of intelligibility and quality of speech signals that are impaired by noise and distortion.

Communication signals in general and speech signals in particular are characterized by an amplitude spectrum having two important structural characteristics: a spectral fine structure, and a spectral envelope. Those portions of speech signals which represent periodic voiced sounds have a discrete fine structure; that is, the amplitude spectrum is composed of a number of individual frequency components of various amplitudes which occur at harmonics of the fundamental frequency of the sound. For those portions of speech signals representative of aperiodic unvoiced sounds, the fine structure is continuous, that is, the spectrum has no individual frequency components. The envelope of the spectrum of a speech signal is the outline of the fine structure of the amplitude spectrum, and the shape of the envelope varies from sound to sound. The spectral envelope of a voiced portion of a speech signal is characterized by several sharp, well-defined peaks or formants, whereas the envelope of an unvoiced portion of a speech signal contains relatively broad peaks.

Noise and nonlinear distortion that alter the structural characteristics of the spectrum of a speech signal seriously impair the intelligibility and quality of voiced portions of the signal. Noise impairs the intelligibility of voiced sounds by adding spurious frequency components in the regions between harmonic components, and nonlinear distortion impairs the quality of voiced sounds by increasing the amplitudes of harmonic components in the small, interformant portions of the spectral envelope relative to the amplitudes of harmonic components in the large, formant portions of the envelope.

It is a specific object of this invention to improve the intelligibility of a speech signal by suppressing spurious frequency components in the interharmonic regions of the fine structure of the spectrum relative to harmonic components.

It is a further object of this invention to improve the quality of a speech signal by suppressing harmonic components in the interformant sections of the spectral envelope relative to harmonic components in the formant sections of the spectral envelope.

In the present invention, the intelligibility and the quality of an incoming speech signal are improved by modulating the speech signal by a selected group of signals derived from the incoming signal. The characteristics of the selected group of signals are selected to produce a non-linear increase in the amplitudes of the frequency components of the modulated signal. In those situations in which the spurious components are smaller in amplitude than the harmonic components, and the interformant components are smaller in amplitude than the formant components, the non-linear increase in amplitudes improves intelligibility by suppressing spurious components relative to harmonic components, and improves quality by suppressing interformant components relative to formant components.

The principles of this invention are embodied in both frequency domain apparatus and time domain apparatus.

In the frequency domain apparatus, the amplitude spectrum of the incoming signal is divided into contiguous frequency bands, which are made sufficiently narrow to define with accuracy the individual harmonic components of voiced portions of the signal. The amplitudes of the frequency components, both spurious and harmonic, contained in the various frequency bands, are raised to a predetermined power and constitute the selected group of signals by which the incoming signal is modulated. Modulation by this selected group of signals improves the intelligibility and the quality of the incoming signal by nonlinearly increasing the amplitudes of its frequency components to suppress both spurious frequency components and inter formant harmonic components. For speech whose quality only is impaired, the frequency bands into which the spectrum of the incoming signal is divided may be made relatively wider, since the suppression of interformant components requires only that the bands be sufficiently narrow to define formant and interformant sections of the envelope, not individual harmonic components.

In the time domain apparatus, the selected group of signals is derived by convolving the incoming signal with itself over a predetermined time delay interval. The group of signals derived by convolution represents the autocorrelation function of the incoming signal, and it is well known that the harmonic frequency components of the autocorrelation function of a signal occur at the same frequencies as the harmonic components of the signal itself; in addition, it is well known that the amplitudes of the autocorrelation harmonic components are equal to the second power of the amplitudes of the corresponding harmonic components of the signal. The predetermined time interval over which the incoming signal is convolved with itself is made several speech periods in length in order to define with accuracy the autocorrelation harmonic components, and modulation of the incoming signal by the group of autocorrelation signals improves intelligibility and quality by suppressing spurious and interformant components through a nonlinear increase in the amplitudes of the frequency components of the modulated signal. For speech whose quality only is impaired, the time delay interval over which the incoming signal is convolved with itself may be shortened to a single speech period or less, since the suppression of interformant components requires accurate definition of only the formant and interformant sections of the autocorrelation spectral envelope, not the individual harmonic components of the autocorrelation spectrum.

An important feature of the time domain embodiment of the principles of this invention is the automatic, error-free tracking of harmonic components of voiced portions of the incoming speech signal by the autocorrelation harmonic components. Changes in the fundamental frequency of the incoming signal are automatically followed by changes in the fundamental frequency of the group of autocorrelation function signals derived from the incoming signal, thereby assuring error-free suppression of spurious and interformant components in the spectrum of the modulated signal. Similarly, for unvoiced portions of the incoming speech signal, the amplitude spectrum of the group of autocorrelation signals automatically becomes continuous, without harmonic components, thereby assuring preservation of the proper continuous spectrum in the unvoiced portions of the modulated signal.

The improvement in intelligibility and quality achieved by this invention is accompanied by audible changes in the characteristics of most voiced sounds. These changes are caused by the exaggeration in the spectral envelope of larger formants relative to smaller formants as a result of the nonlinear increase in frequency component amplitudes effected by this invention. The exaggeration of formants and the accompanying changes in speech sounds may be prevented by utilizing the so-called formant equalizer described in the copending patent application of M. R. Schroeder, filed June 3, 1960, Serial No. 33,741, now matured into Patent No. 3,091,665, issued May 28, 1963. Before the incoming signal is applied to the apparatus of the present invention, it is passed through the formant equalizer. The equalizer divides the amplitude spectrum of the signal into several broad frequency bands, each band corresponding to the usual frequency range in which one of the formants appears. The equalizer reduces the amplitude of each formant by an amount sufficient to prevent the subsequent exaggeration of large formants relative to small formants in the spectral envelope of the modulated signal, and the output signal of the equalizer is then processed by the present invention to improve its intelligibility and quality.

The formant equalizer referred to above may be used in conjunction with either the frequency domain apparatus or the time domain apparatus of this invention. Alternatively, the time domain apparatus of this invention may be modified to prevent the exaggeration of formants without using a formant equalizer. This is achieved by flattening the amplitude spectrum of the incoming speech signal to make its harmonic components uniform in amplitude before convolving the signal with itself. The group of autocorrelation signals derived from the spectrum-flattened signal also has a flat amplitude spectrum, that is, the corresponding autocorrelation harmonic components are also uniform in amplitude. Modulation of the incoming signal by this group of autocorrelation signals nonlinearly increases the amplitudes of the frequency components of the speech spectrum to suppress spurious and interformant components, but the increase in the amplitudes of the harmonic components is uniform, thereby improving intelligibility and quality without exaggerating large formants relative to small formants. The spectrum of the incoming signal is flattened before convolving the signal with itself by generating a uniform amplitude pulse for each speech period of the signal. The generated pulses thus have the same fundamental frequency as the incoming signal, and the autocorrelation function of the pulses has an amplitude spectrum composed of harmonic components that have uniform amplitudes and that occur at the same frequencies as the harmonic components of the incoming signal.

The invention will be fully understood from the following detailed description of illustrative embodiments thereof taken in connection with the appended drawings, in which:

FIGS. 1A, 1B, 1C, 1D, and 1E are diagrams of speech amplitude spectra helpful in explaining the operation of the apparatus of this invention;

Figure 1A:
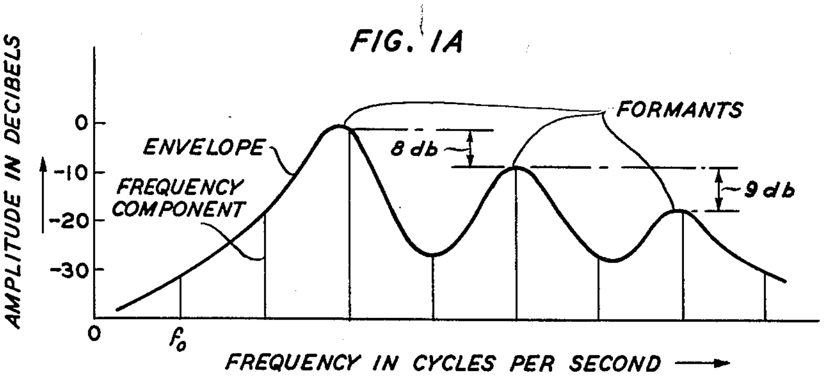
Figure 1B:
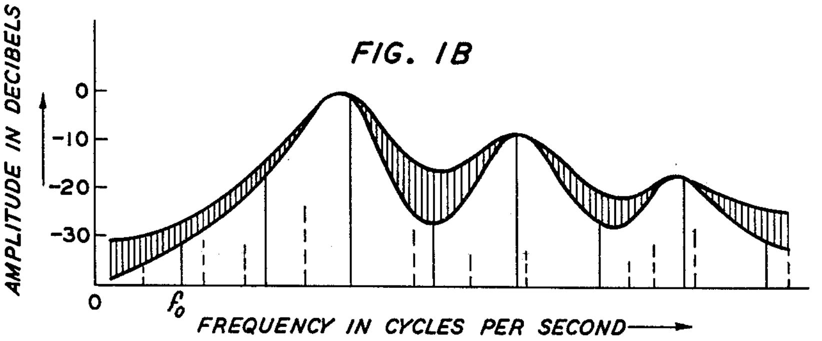

With reference to FIG. 1A, there is shown the amplitude spectrum of a typical voiced speech sound, in which some of the harmonic frequency components of the discrete fine structure are denoted by a number of equally spaced vertical lines recurring at harmonics of the fundamental frequency, $f_0$, and in which the spectral envelope is shown as a curved line containing three distinct peaks or formants. When the intelligibility and quality of this speech sound are impaired by the addition of noise and nonlinear distortion, the speech amplitude spectrum of FIG. 1A appears as shown in FIG. 1B. The dashed vertical lines in FIG. 1B represent spurious frequency components added to the fine structure of the spectrum, and the upper spectral envelope in FIG. 1B indicates alterations in the shape of the original, lower envelope in FIG. 1B caused by disproportionate increases in the amplitudes of the harmonic components of the interformant sections of the envelope relative to the harmonic components of the formant sections.

Figure 1C:
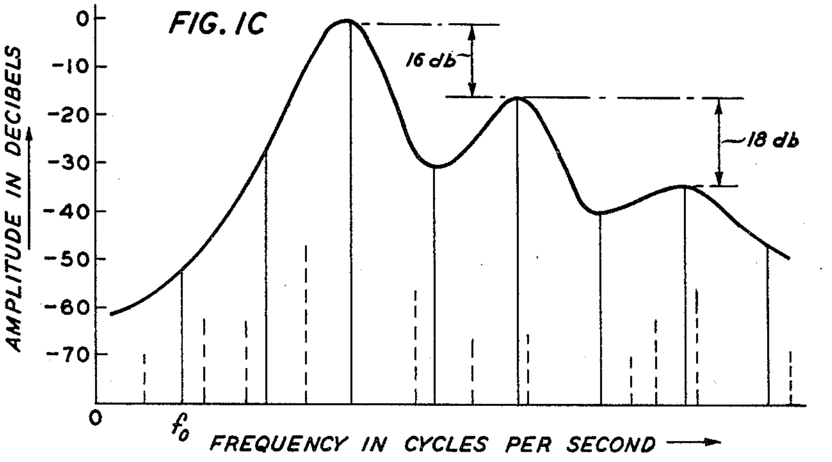

FIG. 1C shows the effect of nonlinearly increasing the amplitudes of the frequency components of FIG. 1B by raising all amplitudes from the first to the second power. From a comparison of FIGS. 1B and 1C, it is observed that the nonlinear increase in amplitudes tends to suppress spurious components relative to harmonic components, as long as the spurious components are smaller in amplitude than the harmonic components. Similarly, a comparison of FIGS. 1A and 1C reveals that the nonlinear increase in amplitudes tends to suppress harmonic components of smaller amplitudes in the interformant segments of the spectral envelope relative to harmonic components of larger amplitudes in the formant segments. Suppression of the spurious components and the interformant harmonic components by the nonlinear increase in amplitudes is accompanied by an improvement in intelligibility and quality, and both the frequency domain and time domain apparatus of this invention operate to improve intelligibility and quality in this fashion.

*Frequency domain apparatus*

Figure 2:
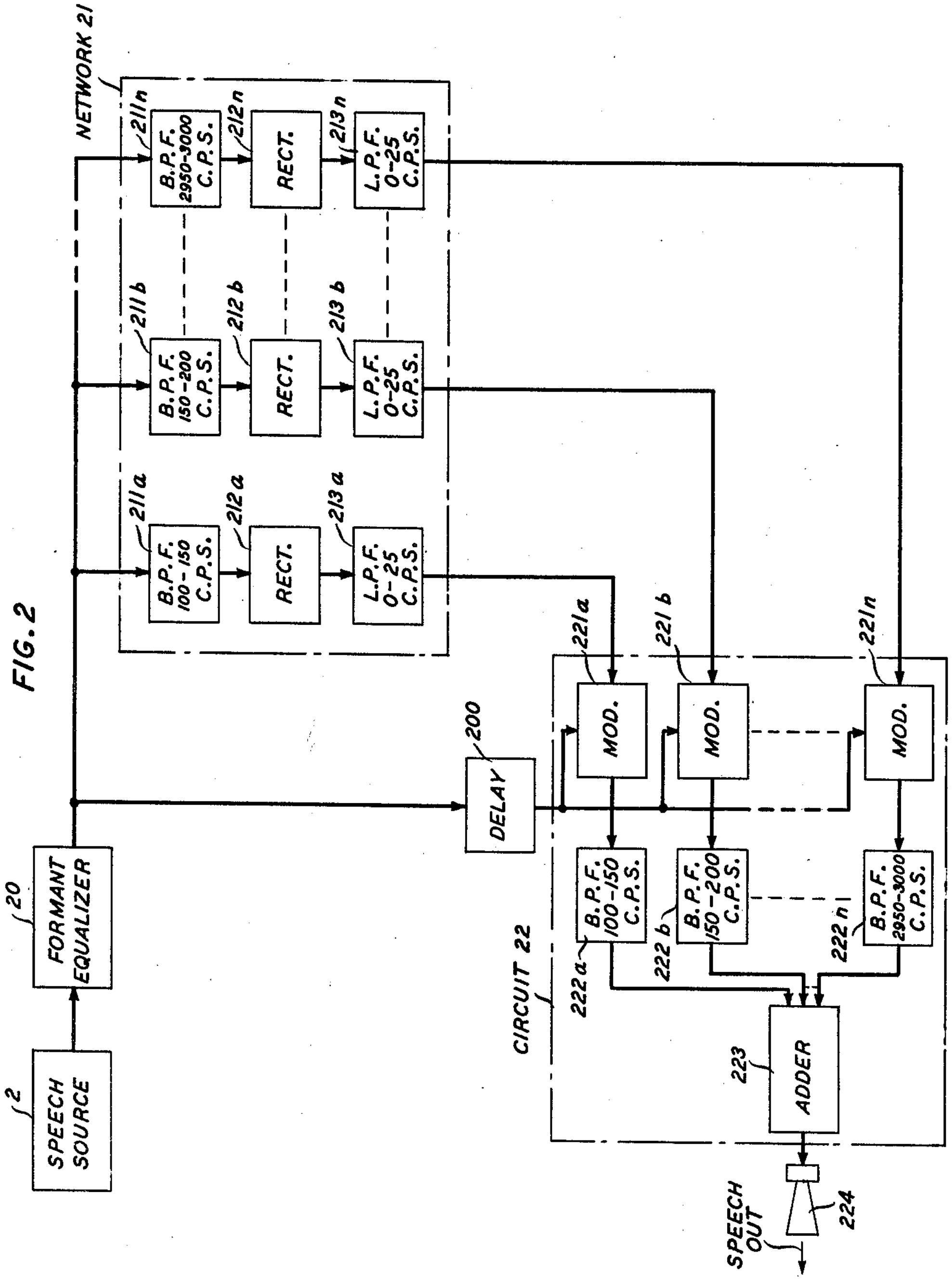
FIG. 2 is a schematic block diagram showing frequency domain apparatus for improving the intelligibility of a distorted speech signal.

Referring now to FIG. 2, an incoming speech signal, having an amplitude spectrum of the type shown in FIG. 1B, is passed from speech source 2 to formant equalizer 20. Source 2 may be any one of a variety of well-known speech processing or transmission systems, and equalizer 20 is of the type described in the M. R. Schroeder patent referred to above. Equalizer 20 reduces the peaks or formants of the spectral envelope of the incoming signal by an amount sufficient to offset increases effected by the remaining apparatus of FIG. 2. A comparison of FIGS. 1A and 1C, for example, reveals that a nonlinear increase in the amplitudes of all frequency components from the first to the second power exaggerates the larger formants relative to the smaller formants by doubling the difference in amplitude between adjacent peaks of the spectral envelope. Equalizer 20 prevents this exaggeration by dividing the amplitude spectrum of the incoming signal into several broad frequency bands, where each band corresponds to the frequency range within which one of the formants usually appears. The amplitude of each frequency band or formant, derived by rectifying and filtering each band, is reduced by an appropriate amount to prevent subsequent exaggeration of formants by the apparatus of the present invention. For example, if $a_i$ is the amplitude of the $i$th formant of the incoming speech signal, then equalizer 20 reduces the amplitude of the $i$th formant to $$a_i^{\frac{1}{x}}$$

where $x$ is the power to which formant amplitudes of the formant-equalized signal are raised by the subsequent nonlinear increase in frequency component amplitudes in the apparatus of this invention. Since $$\left[a_i^{\frac{1}{x}}\right]^x = a_i$$

is the ampliude of the $i$th formant after the nonlinear increase in amplitudes, equalizer 20 thus prevents the exaggeration of larger formants relative to smaller formants by the operation of the apparatus of this invention.

The equalized speech signal from equalizer 20 is applied in parallel to band-pass filters 211$a$ through 211$n$ of network 21 in order to derive a selected group of signals with which to modulate the equalized signal in circuit 22 and thereby improve both its intelligibility and its quality. The pass bands of the filters are contiguous, and the widths of the pass bands of the filters are chosen to define with accuracy the harmonic components of the equalized signal, which correspond in frequency to the harmonic components of the incoming signal. For typical human speech sounds, the widths of the pass bands may be of the order of 50 cycles per second; for example, if the frequency range of the components of the incoming signal extends from 100 to 3,000 cycles per second, then 58 filters with contiguous pass bands 50 cycles per second in width satisfactorily define the harmonic components of the signal, where the pass band of filter 211*a* is 100 to 150 cycles per second, and the pass band of filter 211*n* is 2,950 to 3,000 cycles per second.

Connected to the output terminals of filters 211*a* through 211*n* are rectifiers 212*a* through 212*n*, respectively, of a suitable power law N, $N=1, 2, \ldots$, followed by conventional low-pass filters 213*a* through 213*n*, respectively, where each of the low-pass filters has a cut-off frequency of about 25 cycles per second. The rectifiers and low-pass filters form at the output terminals of network 21 a selected group of signals representative of the amplitudes, raised to the power N, of the frequency components, both spurious and harmonic, passed by filters 211*a* through 211*n*.

The intelligibility and the quality of the equalized signal are improved by using the output signals of network 21 to modulate the signal from equalizer 20 in circuit 22, thereby nonlinearly increasing the amplitudes of the frequency components of the equalized signal by a power N and suppressing spurious and interformant components. Circuit 22 contains a bank of modulators 221*a* through 221*n*, followed by band-pass filters 222*a* through 222*n*, and adder 223, all of which are of well-known design. The output signals of network 21 are applied to the control terminals of modulators 221*a* through 221*n*, and the output signal of equalizer 20, after being synchronized with the output signals of network 21 by passage through suitable delay element 200, is applied in parallel to the input terminals of the modulators. The modulators nonlinearly increase the amplitudes of the frequency components of the equalized signal by the power of the amplitudes represented by the output signals of network 21, and these components are extracted from the modulation products developed at the output terminals of the modulators by filters 222*a* through 222*n*, which have pass bands identical with those of filters 211*a* through 211*n* of network 21. These frequency components are combined, for example, in a conventional adder 223, to form a modulated speech signal whose intelligibility and quality are substantially improved over the intelligibility and quality of the incoming signal from source 2, due to the suppression of spurious and interformant components. The modulated speech signal may be converted into audible speech by reproducer 224, for example, a loudspeaker of any desired sort.

It is to be understood that the amount of the nonlinear increase in frequency component amplitudes, and therefore the degree of suppression of spurious and interformant components, depends upon the power law of rectifiers 212*a* through 212*n* in network 21. For example, if the power law of the rectifiers is denoted by N, $N=1, 2, \ldots$, and the amplitude of the *i*th frequency component of the equalized signal is denoted by $A_i$, then the amplitude of the *i*th frequency component represented by the output signals of network 21 is $A_i^N$, and the amplitude of the *i*th frequency component of the modulated signal is $A_i^{N+1}$. In this example, it is apparent that in order to prevent exaggeration of formants, equalizer 20 must be adjusted to reduce the amplitude of the *i*th formant of the incoming signal to $$a_i^{\frac{1}{N+1}}$$

In those situations in which only the quality of a signal is impaired by nonlinear distortion of the harmonic components, suppression of interformant components of the signal is all that is required in order to effect a substantial improvement. Suppresison of the interformant components may be achieved with less apparatus than is shown in FIG. 2 by increasing the widths of the frequency bands of filters 211*a* through 211*n* of network 21 and of filters 222*a* through 222*n* of circuit 22, since it is only necessary that the pass bands be wide enough to define with accuracy the formant and interformant segments of the envelope. For example, the pass bands are still made contiguous, but the individual bands may be on the order of 150 cycles per second in width, resulting in a substantial saving in both banks of band-pass filters and in the associated rectifiers, low-pass filters, and modulators in network 21 and in circuit 22. Alternatively, a similar economy of apparatus may be achieved by patterning the pass bands of the filters after the well-known Koenig aural scale, which is linear below 1,000 cycles per second and logarithmic above, and is based upon the frequency discrimination characteristics of the average human ear.

*Time domain apparatus*

Figure 3:
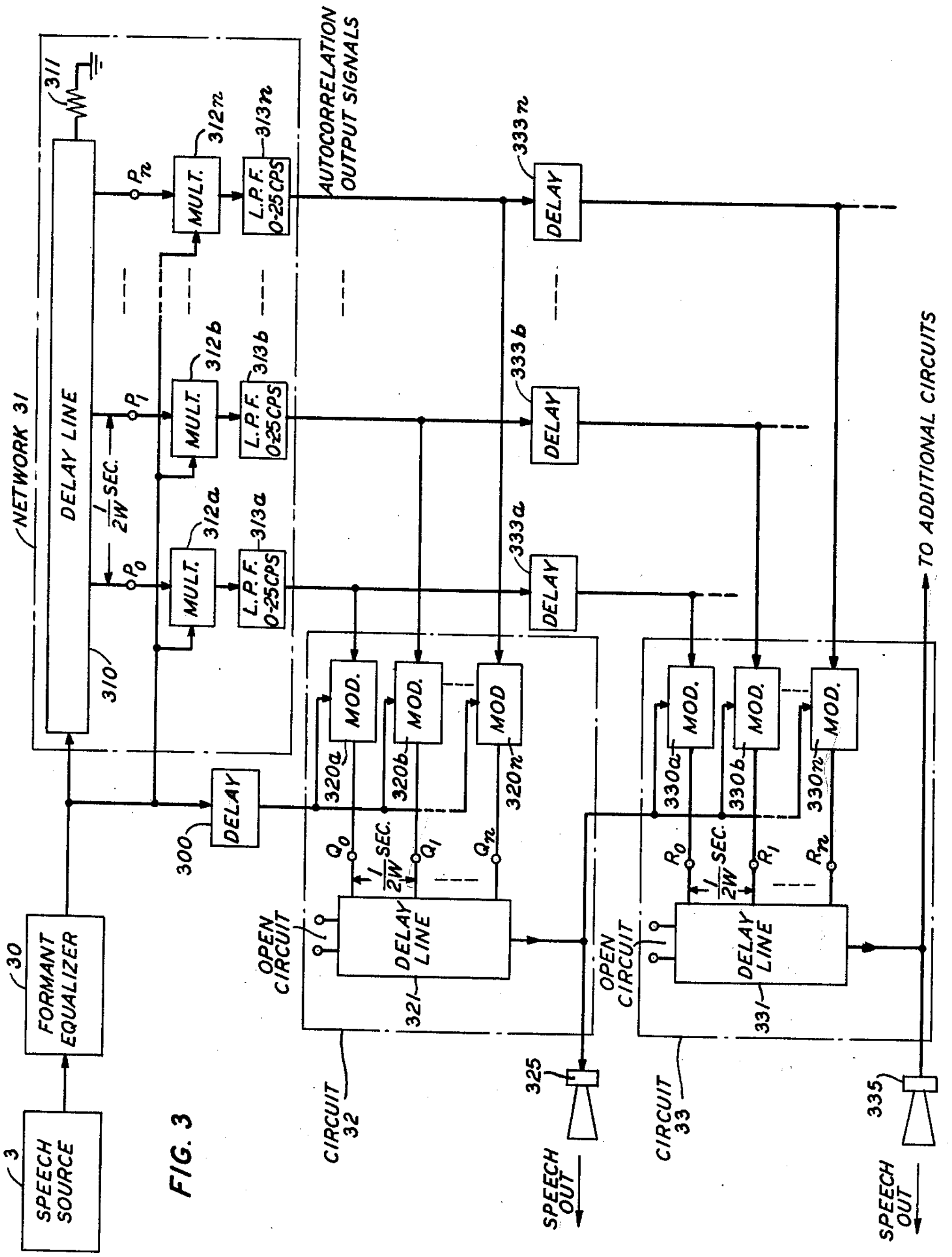
FIG. 3 is a schematic block diagram showing time domain apparatus for improving the intelligibility of a distorted speech signal.

Referring now to the time domain apparatus shown in FIG. 3, a distorted speech signal from speech source 3 is applied to formant equalizer 30, which is identical with equalizer 20 of FIG. 2. Equalizer 30 reduces the formants of the speech signal by an appropriate amount to offset the effect of subsequent increases in formant amplitudes. The equalized speech signal output of equalizer 30 is applied to network 31, which derives from it a selected group of signals with which to modulate the equalized speech signal in circuit 32 and thereby improve both its intelligibility and its quality. Network 31 contains a delay line 310, of any well-known variety, which is terminated in a matched impedance 311 to prevent reflection, and which is provided with taps $P_0$ through $P_n$ spaced at delay intervals of $$0, \frac{1}{2W}, \ldots, \frac{n}{2W}=t \text{ seconds}$$

respectively, where W, in cycles per second, is the highest frequency component or bandlimit of the equalized speech signal. Taps $P_0$ through $P_n$ are connected to one of the input terminals of suitable multipliers 312*a* through 312*n*, respectively, which are followed by conventional low-pass filters 313*a* through 313*n*, each of which has a cut-off frequency of about 25 cycles per second. The equalized speech signal is applied to the input terminal of delay line 310 and in parallel to the input terminals of each of the multipliers 312*a* through 312*n*. From the variously delayed speech signals applied through the taps of delay line 310, and the undelayed speech signal applied directly, multipliers 312*a* through 312*n* develop at their output terminals a group of product signals. The product signals are averaged by low-pass filters 313*a* through 313*n* to form at the output terminals of network 31 a group of signals representative of the convolution of the incoming speech signal with itself over the delay interval from 0 to *t* seconds.

Figure 1D:
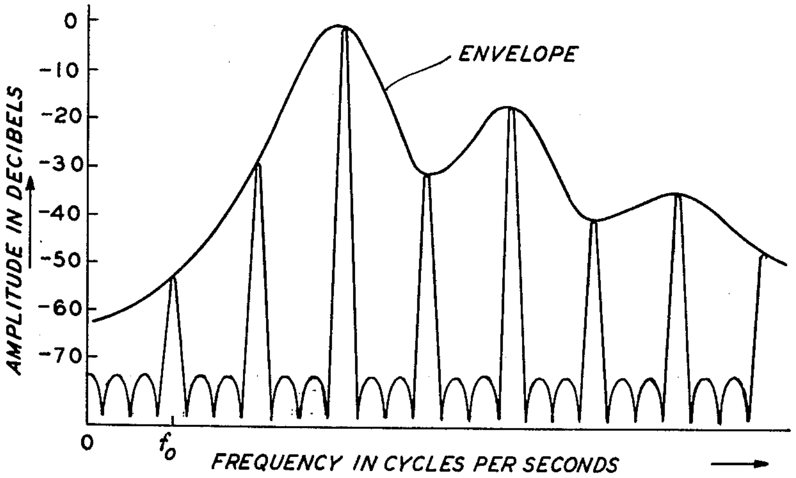

It is well known that convolving a signal with itself in the fashion shown in network 31 produces half periods of the symmetrical autocorrelation function of the signal, where the autocorrelation half periods from 0 to *t* seconds represented by the output signals of network 31 are mirror images of the missing autocorrelation half periods $-t$ to 0 seconds. It is also well known that the amplitude spectrum of the autocorrelation function of a signal is composed of harmonic components that occur at the same frequencies as the harmonic components of the signal itself, and that the amplitudes of the autocorrelation harmonic components are equal to the square or second power of the amplitudes of the corresponding harmonic components of the signal. FIG. 1D shows the amplitude spectrum of the autocorrelation function derived from the signal whose spectrum is shown in FIG. 1B. It is observed that the autocorrelation harmonic components in FIG. 1D occur at the same frequencies as the corresponding harmonic components in FIG. 1B, and that the amplitudes of the autocorrelation harmonic components in FIG. 1D are double the amplitudes of the harmonic components of the signal in FIG. 1B. It is further noted that the spurious components shown in the spectrum of FIG. 1B have been substantially suppressed in the autocorrelation spectrum of FIG. 1D.

It is to be understood, however, that the autocorrelation amplitude spectrum whose characteristics are described above corresponds to an autocorrelation function with full periods, not the half periods represented by the output signals of network 31. In order to obtain spectra with these characteristics, it is necessary to supply the missing half of each autocorrelation period, which is the mirror image of each half period represented by the output signals of network 31. In this invention, the mirror image of each half period signal is supplied in circuits 32, 33, . . . , as described below.

The length of the delay interval, from 0 to $t$ seconds, is made long enough to define with accuracy the individual harmonic components of the group of autocorrelation signals produced by network 31. For a typical range of human voices, a delay interval several speech periods in length, on the order of $t=30$ milliseconds, is sufficient; hence for a speech signal bandlimited to $W=3{,}000$ cycles per second, this delay interval requires that delay line 310 be provided with a total of $n=2W.t=180$ taps, in addition to tap $P_0$ corresponding to 0 seconds delay.

The intelligibility and the quality of the equalized signal are improved by using the autocorrelation function represented by the group of signals from network 31 to modulate the equalized signal in circuit 32. Circuit 32 of FIG. 3 is composed of modulators **320*a* through 320*n*, each of which is provided with an input terminal, a control terminal, and an output terminal. The autocorrelation output signals of network 31 are applied to the control terminals of the modulators, and the equalized speech signal, after being synchronized with the autocorrelation signals by passage through a suitable delay element 300, is applied in parallel to the input terminals of the modulators. The output terminals of modulators 320*a* through 320*n* are connected to delay line 321** through taps $Q_0$ through $Q_n$, respectively, spaced at intervals of $$0, \frac{1}{2W}, \cdot \cdot \cdot, \frac{n}{2W}=t \text{ seconds}$$

Delay line 321 is provided with an open circuit at one end in order to reflect completely the output signals of modulators **320*a* through 320*n*, thereby causing both the modulated signals and their mirror images on the time scale to appear at the output terminal of delay line 321. In effect, then, the equalized signal is modulated by full, symmetric periods of the autocorrelation function, once by the half period autocorrelation signals from network 31**, and, half a period later, by the mirror images of the half period auto-correlation signals. Modulation of the equalized signal by the time domain apparatus of FIG. 3 is particularly effective in nonlinearly increasingly the amplitudes of the frequency components of the equalized signal to suppress spurious and interformant components: spurious components in the spectrum of the speech signal are substantially suppressed in the autocorrelation spectrum, and the autocorrelation harmonic components occur at the same frequencies as the harmonic components of the incoming and equalized signals, as shown in a comparison of FIGS. 1B and 1D, regardless of changes in the fundamental frequency of the incoming signal. Further, for an incoming signal representative of an unvoiced sound with a continuous amplitude spectrum, the corresponding group of autocorrelation signals produced by the apparatus of FIG. 3 also has a continuous spectrum, and modulation by the group of autocorrelation signals assures preservation of the continuous spectrum.

The output signal of delay line 321 may be converted into audible speech by reproducer 325, for example, a suitable loudspeaker, or if further improvement in intelligibility and quality is desired, the output signal may be applied to additional circuits identical with circuit 32, together with the autocorrelation signals from network 31. One such arrangement is illustrated in FIG. 3 by circuit 33, which contains a bank of modulators **330*a* through 330*n* connected to taps $R_0$ through $R_n$, respectively, of delay line 331, all of these elements being identical with the corresponding elements of circuit 32. The output signal of circuit 32 is applied in parallel to the input terminals of modulators 330*a* through 330*n*, and the autocorrelation signals from network 31, after being synchronized with the output signal of circuit 32 by appropriate delay elements 333*a* through 333*n***, are applied to the control terminals of the modulators.

It is to be understood that since the amplitudes of the autocorrelation harmonic components are equal to the square of the amplitudes of the harmonic components of the equalized signal, each successive modulation of the equalized signal by the group of autocorrelation signals nonlinearly increases the amplitudes of the harmonic components of the equalized signal by a power of two. For example, $p$ successive modulations of the equalized signal increase the amplitude of the $i$th harmonic component, $A_i$, of the equalized signal to $A_i^{2p+1}$, thus requiring that equalizer 30 be adjusted to reduce the amplitude of the $i$th formant of the incoming signal to $$a_i^{\frac{1}{2p+1}}$$

in order to prevent exaggeration of formants.

Speech signals impaired only by nonlinear distortion of harmonic components may be improved in quality with substantially less time domain apparatus than is required for the suppression of both spurious and interformant components. Suppression of interformant components requires only that the formant and interformant portions of the spectral envelope be well defined, and this degree of definition is achieved by convolving the equalized signal with itself over a delay interval that is short as compared with the delay interval required for definition of individual autocorrelation harmonic components. For example, formant and interformant portions of the autocorrelation spectral envelope are accurately defined by convolving the incoming signal with itself over a delay interval equal to or less than a single speech period in length, on the order of $t=5$ milliseconds, thereby reducing the number of taps on delay line 310 to $n=30$, plus one tap $P_0$ for 0 seconds delay, for a speech signal bandlimited to $W=3{,}000$ cycles per second. The reduction in the length of delay line 310 is accompanied by a reduction in the number of associated multipliers and low-pass filters in network 31, as well as by a reduction in the number of modulators and the length of the delay line in each circuit 32, 33, . . . . The group of autocorrelation signals derived by convolving the incoming signal with itself over a relatively short delay interval has an amplitude spectrum with a well-defined envelope of the shape and amplitude shown in the envelope in FIG. 1D, but the fine structure of the spectrum is continuous, not discrete. Modulation of the equalized signal in circuit 32 by this group of autocorrelation signals improves quality by suppressing interformant portions of the envelope of the equalized signal.

Figure 1E:
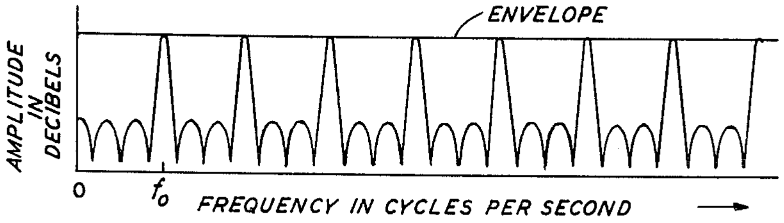
Figure 4:
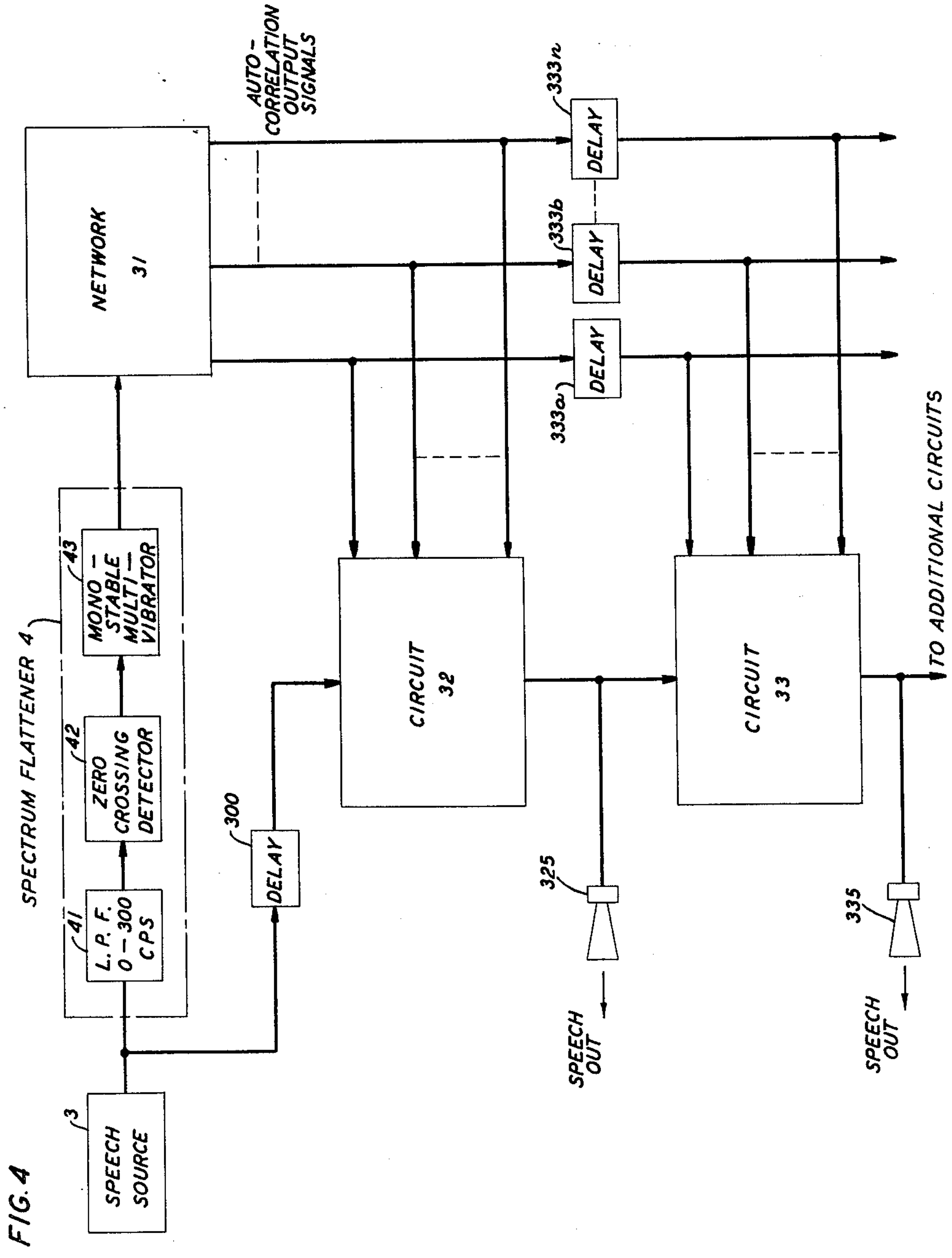
FIG. 4 is a schematic block diagram showing apparatus alternative to that shown in FIG. 3.

The time domain apparatus shown in FIG. 3 may be modified to prevent the exaggeration of formants without using formant equalizer 30, as illustrated in FIG. 4. In place of formant equalizer 30, the incoming speech signal from source 3 is applied to spectrum flattener 4 before convolving it with itself in network 31. Spectrum flattener 4 is an excitation generator of the type described in the copending application of M. R. Schroeder, Serial No. 774,173, filed November 17, 1958 now matured into Patent 3,030,450, issued April 17, 1962, and generates a periodic sequence of uniform amplitude pulses from periodic voiced portions of the incoming signal, and a random sequence of uniform amplitude pulses from aperiodic unvoiced portions of the incoming signal. The amplitude spectrum of these uniform amplitude pulses is substantially flat, that is, the spectral envelope is flat, and for a periodic sequence of pulses, the harmonic components are uniform in amplitude and occur at the same frequencies as the harmonic components of the incoming signal. Correspondingly, the group of autocorrelation signals derived by convolving the uniform amplitude pulses with themselves also has a flat amplitude spectrum, as shown in FIG. 1E. Modulation of the incoming signal in circuit 32 by this group of autocorrelation signals non-linearly increases the amplitudes of the frequency components of the incoming signal to suppress spurious and interformant components, but the nonlinear increase in the amplitudes of harmonic components is uniform, thereby improving the intelligibility and the quality of the modulated signal without exaggerating large formants relative to small formants.

Spectrum flattener 4 is composed of a low-pass filter 41, a zero crossing detector 42, and a monostable multivibrator 43 connected in series, all of which are of well-known construction. The cut-off frequency of filter 41 is selected to pass the fundamental frequency component of a wide variety of human voices, for example, a cut-off frequency on the order of 300 cycles per second is satisfactory. Each zero crossing of the fundamental component passed by filter 41 is counted by zero crossing detector 42, and produces a uniform amplitude pulse at the output terminal of spectrum flattener 4 by triggering multivibrator 43 to its monostable state. During periodic voiced portions of the incoming signal, the zero crossings are periodic, and a periodic sequence of uniform amplitude pulses is generated at the output terminal of spectrum flattener 4; during aperiodic unvoiced portions of the incoming signal, the zero crossings are aperiodic and an aperiodic sequence of uniform amplitude pulses is generated at the output terminal of spectrum flattener 4.

It is to be understood that the above-described arrangements are merely illustrative of applications of the principles of the invention. Numerous other arrangements may be devised by those skilled in the art without departing from the spirit and scope of the invention.

What is claimed is:

1. The method of improving the intelligibility and quality of a speech signal impaired both by noise which adds to the spectrum of said speech signal spurious frequency components in the regions between speech frequency components and by distortion which increases the amplitudes of speech frequency components in the regions between formant peaks in the spectral envelope of said speech signal relative to the amplitudes of speech frequency components in the regions of the formant peaks in said spectral envelope, which comprises the steps of reducing the magnitudes of the formant peaks of the spectral envelope of said speech signal by a predetermined amount to form an equalized speech signal nonlinearly increasing the amplitudes of all of the frequency components in the spectrum of said equalized speech signal in order to form an improved signal by suppressing in the spectrum of said equalized speech signal the amplitudes of spurious frequency components relative to speech frequency components and by suppressing the amplitudes of speech frequency components in the regions between formant peaks in the spectral envelope of said equalized signal relative to the amplitudes of speech frequency components in the regions of said formant peaks in said spectral envelope, wherein said predetermined amount by which said formant peaks are reduced in magnitude is selected to prevent exaggeration of larger magnitude formant peaks relative to smaller magnitude formant peaks by said nonlinear increase in the amplitudes of all of said frequency components, and reproducing said improved signal as audible sound.

2. The method of improving the intelligibility and quality of a speech signal which comprises the steps of reducing the magnitudes of the formant portions of the spectral envelope of said speech signal by a predetermined amount to form an equalized speech signal, dividing said equalized signal into its individual frequency components to obtain a selected group of signals representative of the amplitudes of said frequency components, and modulating said equalized signal by said selected group of signals to increase nonlinearly the amplitudes of the frequency components of said equalized signal.

3. The method of suppressing noise and nonlinear distortion in a speech signal which comprises the steps of selectively reducing the magnitudes of the formant portions of the spectral envelope of said speech signal to form an equalized speech signal, deriving from said equalized signal a group of signals proportional to the amplitudes of the individual frequency components of said equalized signal, and nonlinearly increasing the amplitude of each of said frequency components of said equalized signal by an amount proportional to the amplitudes represented by said group of signals.

4. The method of suppressing noise and nonlinear distortion in a speech signal which comprises the steps of selectively decreasing the magnitudes of the formant segments of the spectral envelope of said speech signal to form an equalized speech signal, convolving said equalized speech signal with itself over a predetermined delay interval to form a group of signals representative of the autocorrelation function of said equalized signal, and modulating said equalized signal by said group of autocorrelation signals to increase nonlinearly the amplitudes of the frequency components of said equalized signal.

5. Apparatus for improving the intelligibility and the quality of a speech signal which comprises a source of a speech signal, means for reducing the magnitude of each formant of said speech signal by a predetermined amount to form an equalized signal, means for deriving from said equalized signal a selected group of signals representative of the amplitudes of individual frequency components of said equalized signal, and means for modulating said equalized signal by said selected group of signals to produce a nonlinear increase in the amplitudes of the frequency components of said equalized signal.

6. Apparatus for suppressing noise and nonlinear distortion in a speech signal which comprises a source of a speech signal, means for reducing the magnitudes of the formants of said speech signal by a predetermined amount to form an equalized speech signal, means for deriving from said equalized signal a group of signals proportional to the amplitudes of the individual frequency components of said equalized signal, and means for modulating said equalized signal by said group of amplitude signals in order to increase nonlinearly the amplitudes of said frequency components of said equalized signal.

7. In a system for suppressing interformant harmonic components and spurious interharmonic frequency components in a speech signal, the combination that comprises a source of a speech signal, means for reducing the magnitudes of the formants of said speech signal by a predetermined amount to form an equalized speech signal, a plurality of band-pass filters with contiguous pass bands spanning the frequency range of said equalized signal, means for applying said equalized signal in parallel to said band-pass filters, a plurality of rectifiers in one-to-one correspondence with said band-pass filters, said rectifiers having a selected power law, N, $N=1,2, \ldots$, means for connecting said band-pass filters to said corresponding rectifiers, a plurality of low-pass filters in one-to-one correspondence with said rectifiers, means for connecting said rectifiers to said corresponding low-pass filters, a plurality of modulators in one-to-one correspondence with said low-pass filters, wherein each of said modulators is provided with an input terminal, a control terminal and an output terminal, means for applying said equalized signal in parallel to the input terminals of said modulators, means for connecting said low-pass filters to the control terminals of said corresponding modulators, adding means, and means for connecting the output terminals of said modulators to said adding means.

8. Apparatus for suppressing spurious interharmonic frequency components and interformant harmonic components in a speech signal which comprises a source of a speech signal, means for equalizing the formants of said speech signal to form an equalized speech signal, means for convolving said equalized signal with itself over a predetermined delay interval to derive a group of signals representative of the autocorrelation function of said equalized signal, and means for nonlinearly increasing the amplitudes of the frequency components of said equalized signal by the amplitudes of the frequency components of said group of autocorrelation signals.

9. Apparatus as defined in claim 8 wherein said means for convolving said equalized signal with itself over a predetermined delay interval comprises a signal propagation device provided with a plurality of taps, an input terminal at one end, and a matched impedance at the other end, a plurality of multiplying means, each of which is provided with two input terminals and an output terminal, means for connecting each tap of said propagation device to an input terminal of one of said multiplying means, means for applying said equalized signal to the input terminal of said propagation terminal and in parallel to an input terminal of each of said multiplying means, a plurality of averaging devices, each of which is provided with an input terminal and an output terminal, and means for connecting the output terminal of each of said multiplying means to the input terminal of one of said averaging devices, whereby the group of signals developed at the output terminals of said averaging devices is representative of the autocorrelation function of said equalized signal.

10. Apparatus as defined in claim 8 wherein said means for nonlinearly increasing the amplitudes of the frequency components of said equalized signal comprises a plurality of modulators in one-to-one correspondence with said group of autocorrelation signals, each of said modulators being provided with a control terminal, an input terminal, and an output terminal, means for applying each of said autocorrelation signals to the control terminal of the corresponding modulator, means for applying said equalized signal in parallel to the input terminals of said modulators, a signal propagation device provided with an open circuit at one end, an output terminal at the other end, and a plurality of taps in one-to-one correspondence with said modulators, and means for connecting the output terminal of each of said modulators to the corresponding tap of said signal propagation device.

11. In a system for improving the intelligibility and the quality of a speech signal, the combination that comprises a source of a speech signal, means for flattening the amplitude spectrum of said speech signal, means for convolving said spectrum-flattened signal with itself over a predetermined delay interval to derive a group of signals representative of the autocorrelation function of said spectrum-flattened signal, and means for modulating said speech signal by said group of autocorrelation signals.

12. Apparatus for suppressing inerformant harmonic components and spurious interharmonic components which comprises a source of a speech signal, means for deriving from said speech signal a sequence of uniform amplitude pulses, means for convolving said sequence of pulses with themselves over a predetermined time delay interval to derive a group of signals representative of the autocorrelation function of said pulses, and means for non-linearly increasing the amplitudes of the frequency components of said speech signal by the amplitudes of the frequency components of said group of autocorrelation signals.

13. Apparatus as defined in claim 12 wherein said means for deriving from said speech signal a sequence of uniform amplitude pulses comprises a nonlinear distortion network supplied with said speech signal, a source of pulses having a predetermined pulse rate, and means connected to said nonlinear distortion network and said pulse source for generating a periodic sequence of uniform amplitude pulses in response to voiced portions of said speech signal and a random sequence of uniform amplitude pulses in response to unvoiced portions of said speech signal.

14. The method of improving the intelligibility and quality of a speech signal impaired both by noise which adds to the spectrum of said speech signal spurious frequency components in the regions between speech frequency components and by distortion which increases the amplitudes of speech frequency components in the regions between formant peaks in the spectral envelope of said speech signal relative to the amplitudes of speech frequency components in the regions of the formant peaks in said spectral envelope, which comprises the steps of selectively reducing the magnitudes of the formant peaks of the spectral envelope of said speech signal by obtaining the $x$th root of the magnitude of each of said formant peaks to form a rooted signal, $x=2, 3, 4, \ldots$, raising the amplitude of each frequency component of said rooted signal to the $x$th power in order to form an improved signal by suppressing in the spectrum of said rooted signal the amplitudes of spurious frequency components relative to speech frequency components and by suppressing the amplitudes of speech frequency components in the regions between formant peaks in said spectral envelope relative to the amplitudes of speech frequency components in the regions of said formant peaks in said spectral envelope, wherein said predetermined amount by which said formant peaks are reduced in magnitude is selected to prevent exaggeration of larger magnitude formant peaks relative to smaller magnitude formant peaks by said nonlinear increase in the amplitude of all of said frequency components, and reproducing said improved signal as audible sound.

15. Apparatus for improving the intelligibility and the quality of a speech signal which comprises equalizing means supplied with an incoming speech signal for reducing the magnitude, $a_i$, $i=1, 2, 3, \ldots$, of the peaks of the spectral envelope of said signal to $$a_i^{\frac{1}{x}}$$

where $x=2, 3, 4, \ldots$, control signal generating means for deriving from said equalized signal a group of control signals representative of the amplitudes of the individual frequency components of said equalized signal raised to the Nth power, $N=1, 2, 3, \ldots$, and modulating means responsive to said group of control signals and supplied with said equalized signal for raising the amplitude of each frequency component of said equalized signal to the $(N+1)$ power, where $(N+1)=x$.

References Cited by the Examiner

UNITED STATES PATENTS

| | | | |
|---|---|---|---|
| 2,195,081 | 3/40 | Dudley | 179—1 |
| 2,243,089 | 3/41 | Dudley | 179—1 |
| 2,243,526 | 5/41 | Dudley | 179—1 |
| 2,243,527 | 5/41 | Dudley | 179—1 |
| 2,646,465 | 7/53 | Davis et al. | 179—1 |
| 2,701,305 | 2/55 | Hopper | 179—1 |
| 2,953,644 | 9/60 | Miller | 179—1 |

ROBERT H. ROSE, *Primary Examiner.*

L. MILLER ANDRUS, WILLIAM C. COOPER, *Examiners.*